United States Patent
Timtner et al.

(10) Patent No.: US 8,651,498 B2
(45) Date of Patent: Feb. 18, 2014

(54) CLAMPING CHUCK FOR RADIALLY CLAMPING WORKPIECES WITH A CYLINDRICAL OUTER CLAMPING SURFACE

(75) Inventors: Karlheinz Timtner, Bad Homburg v.d.H. (DE); Dieter Thelen, Modautal (DE)

(73) Assignee: Schenck RoTec GmbH, Darmstadt (DE)

(*) Notice: Subject to any disclaimer, the term of this patent is extended or adjusted under 35 U.S.C. 154(b) by 1041 days.

(21) Appl. No.: 12/586,014

(22) Filed: Sep. 16, 2009

(65) Prior Publication Data

US 2010/0109261 A1    May 6, 2010

(30) Foreign Application Priority Data

Oct. 31, 2008 (DE) .......................... 10 2008 054 140

(51) Int. Cl.
*B23B 31/20* (2006.01)
(52) U.S. Cl.
USPC ....... 279/4.07; 279/4.09; 279/43.2; 279/43.4; 279/46.3
(58) Field of Classification Search
USPC ............. 279/139, 4.04, 4.05, 4.07, 106, 2.05, 279/2.02, 2.03, 2.07, 2.08, 4.03, 4.09, 132, 279/133, 137, 4.08, 119, 35, 37, 43, 46.9, 279/50, 43.4, 43.2, 46.3, 107, 109, 55, 57, 279/4.01, 4.1, 4.12
See application file for complete search history.

(56) References Cited

U.S. PATENT DOCUMENTS 1,363,953 A * 12/1920 Carll ................................ 279/36
2,279,310 A *  4/1942 Grey ................................ 279/78
(Continued)

FOREIGN PATENT DOCUMENTS

DE         103 05 714       8/2004
DE     10 2005 053 786      5/2007
(Continued)

OTHER PUBLICATIONS

Great Britain Search Report dated Jan. 29, 2010.
(Continued)

*Primary Examiner* — Eric A Gates
*Assistant Examiner* — Paul M Janeski
(74) *Attorney, Agent, or Firm* — Collard & Roe, P.C.

(57) ABSTRACT

A clamping chuck (1) for radially clamping workpieces with a cylindrical outer clamping surface includes an annular base member (2) which has a hole (5), a shoulder (11), which projects inwards radially and forms a contact surface for the workpiece, an axially-extending hole face (10) and tabs (12) which project inwards radially. Arranged on the base member (2) is a clamping member which is divided into a plurality of substantially L-shaped clamping elements (21), which each include a clamping head (24) arranged in the hole and an actuating lever (27) which extends outwards radially from the clamping head (24). Each clamping head (24) includes, on the outer side thereof, at least one cam (25), which projects outwards radially, engages in a gap between the shoulder (11) and the tabs (12) and is supported radially by the hole face (10) and axially by at least one tab (12). On their inner side, each clamping head has a clamping edge (26) which is arranged in such a way that, upon rotation of the clamping elements (21), during which the actuating levers (27) move away from the base member (2), the edge moves inwards in a radial direction and towards the shoulder (11) in an axial direction.

9 Claims, 4 Drawing Sheets

(56) References Cited

U.S. PATENT DOCUMENTS

| | | | | |
|---|---|---|---|---|
| 2,443,895 | A | * | 6/1948 | Day et al. .................. 279/136 |
| 2,719,721 | A | * | 10/1955 | Grobey ..................... 279/4.04 |
| 2,769,643 | A | * | 11/1956 | Denzler ..................... 279/50 |
| 2,832,601 | A | * | 4/1958 | Mann ........................ 279/2.05 |
| 3,131,948 | A | * | 5/1964 | Buck ......................... 279/106 |
| 3,240,520 | A | * | 3/1966 | Dailey ....................... 403/325 |
| 3,427,036 | A | * | 2/1969 | Siebelhoff ................. 279/4.09 |
| 3,596,917 | A | * | 8/1971 | Meyer ........................ 279/89 |
| 3,727,930 | A | * | 4/1973 | Anderson ................... 279/50 |
| 5,131,705 | A | * | 7/1992 | Gluck et al. .............. 294/82.32 |
| 5,326,114 | A | * | 7/1994 | Piotrowski ................. 279/4.05 |
| 5,429,376 | A | * | 7/1995 | Mueller et al. ............ 279/4.07 |
| 5,441,284 | A | * | 8/1995 | Mueller et al. ............ 279/2.02 |
| 5,580,301 | A | * | 12/1996 | Muller ........................ 451/342 |
| 2006/0131821 | A1 | | 6/2006 | Carrier |
| 2008/0289416 | A1 | | 11/2008 | Thelen |

FOREIGN PATENT DOCUMENTS

| | | | |
|---|---|---|---|
| GB | 2 058 293 A | | 4/1981 |
| JP | 60-155305 | | 8/1985 |
| JP | 2001-212707 A | | 8/2001 |
| JP | 2001300803 A | * | 10/2001 |
| WO | WO 2009/068473 | | 6/2009 |

OTHER PUBLICATIONS

Great Britain Search Report of GB 0919098.4, dated Nov. 22, 2012.

* cited by examiner

CLAMPING CHUCK FOR RADIALLY CLAMPING WORKPIECES WITH A CYLINDRICAL OUTER CLAMPING SURFACE

CROSS REFERENCE TO RELATED APPLICATIONS

Applicants claim priority under 35 U.S.C. §119 of German Application No. 10 2008 054 140.0 filed Oct. 31, 2008.

FIELD OF THE INVENTION

The invention relates to a clamping chuck for radially clamping workpieces with a cylindrical outer clamping surface, comprising an annular base member which has a hole with an axially-extending hole face and comprising a shoulder which projects inwards radially and has a contact surface for the workpiece, and a clamping device which is supported on the base member.

BACKGROUND OF THE INVENTION

A clamping chuck of the type disclosed is known from DE 10 2005 053 786 A1. The known clamping chuck is part of a device for the dynamic measurement of the unbalance of the rotor of a turbocharger core assembly. In the case of the known clamping chuck, the bearing housing of the turbocharger core assembly is received and centered in the hole in the base member and clamped in an axial direction against the shoulder of the base member by way of clamping claws. The bearing housing accordingly comprises an annular flange to which the clamping claws may grip. Automatic clamping is not possible with the known clamping chuck.

A balancing chuck for the dynamic balancing of motor vehicle drive shafts is also known from DE 103 05 714 A1, consisting of a base member comprising a centering face and an insert containing a collet chuck and an axial stop surface for the workpiece, as well as a plurality of clamping claws mounted on the base member so as to be rotatable and axially displaceable. In the case of this balancing chuck, the workpiece is centered on a cylindrical outer surface using the collet chuck and clamped in an axial direction against the stop surface of the insert by the clamping claws. The known balancing chuck is of complex and expensive structure, must be long in the axial direction and have a large axial actuating stroke.

SUMMARY OF THE INVENTION

The object of the invention is to provide a clamping chuck of the aforementioned type which takes up less space and is characterized, above all, by being short in length. Furthermore, the clamping chuck should have in its centre a free space, which has a large diameter and which is long in the axial direction, for receiving workpieces. The clamping chuck should also be automatically actuatable.

The above object is achieved in accordance with the invention by a clamping chuck having the features disclosed in claim 1. Advantageous embodiments of the clamping chuck are disclosed in claims 2 to 8.

In accordance with the invention the clamping chuck comprises an annular base member which has a hole, a shoulder which projects inwards radially and forms a contact surface for the workpiece, an axially-extending hole face and tabs which project inwards radially, and a clamping device which is supported on the base member and has a plurality of substantially L-shaped clamping elements which each comprise a clamping head arranged in the hole and an actuating lever which extends outwards radially from the clamping head, in which each clamping head comprises, on the outer side thereof, at least one cam which projects outwards radially, engages in a gap between the shoulder and the tabs and is supported radially by the hole face and axially by at least one tab, and on the inner side thereof, a clamping edge which is arranged in such a way that, upon rotation of the clamping element, during which the actuating lever moves away from the base member, said edge moves inwards in a radial direction and towards the shoulder in an axial direction.

The invention provides a clamping chuck which is characterized by an extremely short length in the axial direction and by taking up a relatively small amount of space in the radial direction. A free space, of which the diameter is equal to or only slightly smaller than the clamping diameter, is provided in the centre of the clamping chuck. Above all, it is advantageous that the clamping chuck is highly radially rigid, since the clamping force of the clamping device is transferred from the clamping heads to the base member which, for example, may be connected to the machine receptacle. The workpiece is clamped in a very precise and highly concentric manner and, in addition to radially clamping the workpiece, the movement of the clamping elements during the clamping process also presses the workpiece axially against the planar surface of the shoulder. Precise clamping with a high retaining force is thus not only achieved, but the clamped workpiece is also simultaneously arranged in a rather concentric manner. The clamping chuck may be actuated mechanically, hydraulically or pneumatically using simple means and by automatic means. The rotation of the clamping elements, in particular when supporting the release movement, ensures that a relatively large amount of insertion clearance is available, making it easier to automatically insert the workpiece into the clamping device.

An embodiment in which the clamping elements are arranged in an annular manner and are connected to one another by resilient connection elements is particularly advantageous. In this case, the clamping elements form part of an annular clamping member which can easily be assembled and facilitates retention of the individual clamping elements in the assembled position on the base member. The clamping chuck is preferably formed in one piece which is separated into the individual clamping elements by radial slots.

According to a further advantage of the invention, it is provided for the tabs of the base member and the cams of the clamping member to be arranged at equal, regular distances from one another, the distance between the tabs being greater than the width of the cams in the circumferential direction. This configuration has the advantage that the clamping elements connected to one another to form an annular clamping member can be brought into the assembled position on the base member by way of an axial movement and subsequent rotation, similarly to a bayonet coupling. The base member, therefore, does not need to be separated but may form a closed ring which can be produced in a simple and cost-effective manner.

An axially displaceable annular piston may be arranged on the base member in order to actuate the clamping elements. In order to enable hydraulic or pneumatic actuation, the annular piston may delimit an annular chamber which has a connection for supplying a pressure medium. If the release movement of the clamping chuck is also to be supported hydraulically or pneumatically, the annular piston may be formed so as to be double-acting and so as to comprise annular chambers arranged on opposite sides. For mechanical actuation, the annular piston may be formed as an actuation ring and can be actuated by means of a shift fork.

The base member is preferably provided with a planar flange face on the side remote from the clamping elements, via which flange face the base member may be attached to a connection component, for example a machine for measuring unbalance.

BRIEF DESCRIPTION OF THE DRAWINGS

The invention will be described in greater detail with reference to an embodiment shown in the drawings, in which.

DETAILED DESCRIPTION OF THE DRAWINGS

Figure 1:
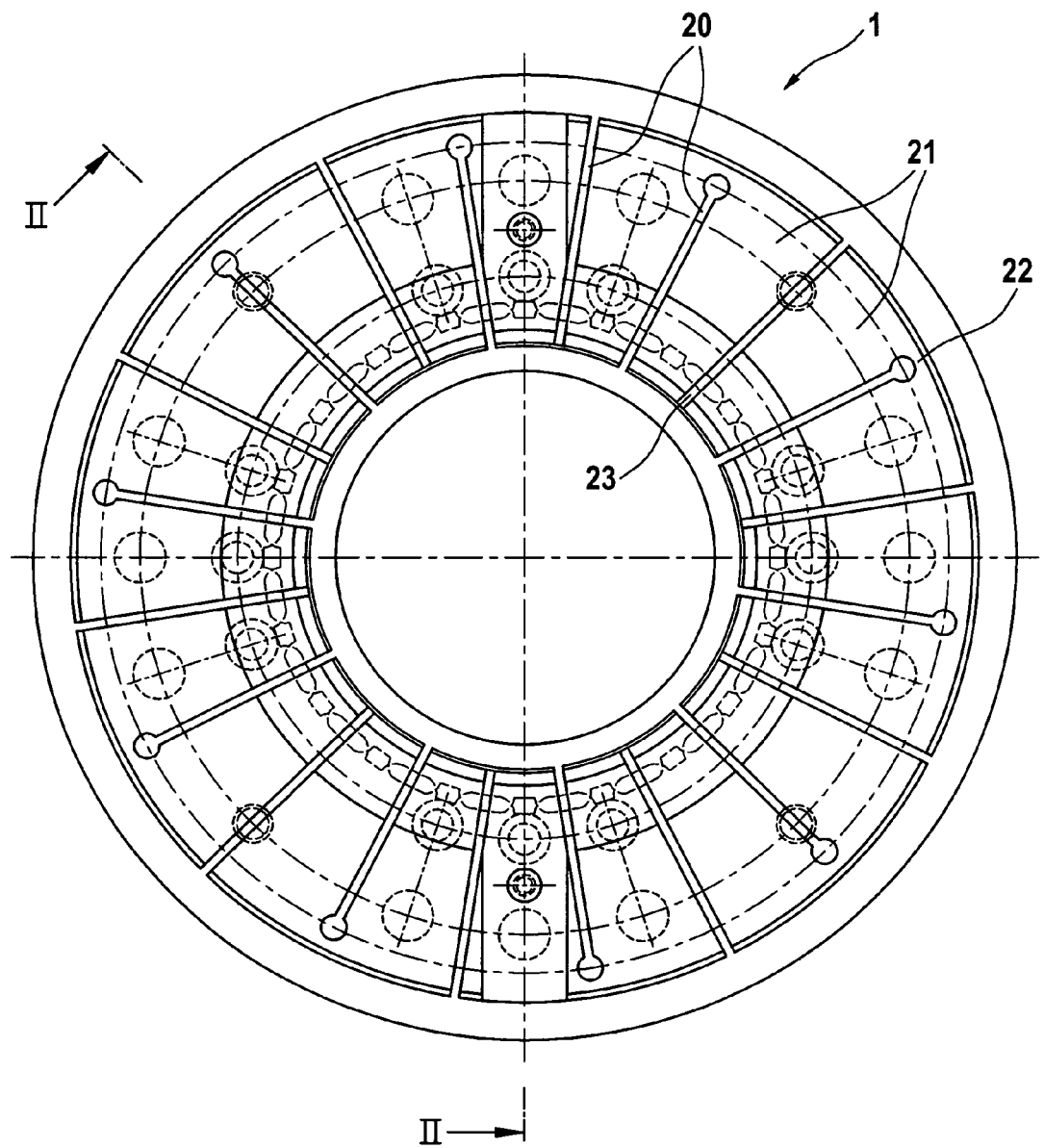
FIG. 1 is a side view of a clamp coupling according to the invention.

The clamp coupling 1 shown in the drawings basically consists of an annular base member 2, an annular clamping member 3 and an annular piston 4 arranged on the base member 2 for actuating the clamping member 3.

The base member 2 comprises a central throughhole 5 and a planar flange face 6 which is at right angles to the axis of the hole and flanges the base member 2 to a connecting portion of a machine. Next to the flange face 6 an annular disc 8 is inserted into a stepped extension 7 of the hole 5 and fixed by means of screws 9. The inner diameter of the disc 8 is smaller than that of the hole 5 and, with its side remote from the flange face 6, forms a shoulder comprising a planar face which is parallel to the flange face 6 and axially supports a workpiece clamped in the clamp coupling 1. Instead of the disc 8, the shoulder 11 may also be formed by a corresponding portion of the base member 2 or by a portion of a machine receiving the clamp coupling, which portion is connected to the base member 2, in the latter case in particular the shoulder and its planar face also possibly being arranged outside the clamping chuck. Next to the disc 8 a hole face 10 is formed in the hole 5 and tabs 12 are formed at a distance from the disc 8, which tabs extend axially and in the circumferential direction. The tabs 12 are arranged at regular distances and are separated from one another by gaps, the inner diameter in the region of the gaps being the same as or greater than the inner diameter of the hole face 10. On the side facing the hole face 10, the tabs 12 have contact surfaces 13 arranged in a common radial plane.

The outer surface of the base member 2 comprises two cylindrical guide faces 14, 15 which have different diameters and are separated from one another by a radial step. The annular piston 4 configured with a corresponding stepped hole surrounds the base member 2 and is guided in an axially displaceable manner at the guide faces 14, 15. Annular seals 16, 17 seal the annular piston 4 at the guide faces 14, 15. An annular chamber 18 is arranged between the steps in the base member 2 and the annular piston 4, which chamber can be connected via a connecting channel 19 to a hydraulic or pneumatic pressure source. By pressurizing the annular chamber 18, the annular piston 4 can be moved in a direction in which it is distanced from the flange face 6.

The clamping member 3 consists of a one-piece ring having a substantially L-shaped cross-section. The clamping member 3 comprises radial slots 20 in the distance separating the tabs 12 of the base member 2, which slots alternately divide either only the inner edge or only the outer edge of the clamping member 3. The slots 20 separate the clamping member 3 into individual clamping elements 21 which are alternately connected to one another at their radially outer edge by a web 22 and at their radially inner edge by a web 23. The radially inner, short branch of the clamping elements 21 forms, in each case, an axially extending clamping head 24 which comprises, on its outer side, a radially projecting cam 25 and, on its inner side, a clamping edge 26. The long branch of the clamping elements 21 forms an actuating lever 27 which extends radially outwards from the clamping head 24.

The clamping edge 26 is formed by a step between a front cylindrical hole face 28 and a rear cylindrical hole face 29. Conical faces 30, 31 are connected to the rear cylindrical hole face 29 and facilitate insertion of a workpiece W into the clamp coupling 1.

The cams 25 are delimited at their axial end faces by planar radial faces and comprise at their radially outer ends cylindrical end faces 32 which have the same, or almost the same radius as the hole face 10. Together with the front and rear radial faces of the cams 25, the end faces 32 form front edges 33 and rear edges 34, via which the cams 25 are supported on the base member 2. Whilst the front edge 33 is, in each case, arranged at the end-face front ends of the clamping heads 24, the clamping edge 26 is arranged at a distance b from the end-face end, providing a lever arm for clamping.

Once the clamping member 3 has been fitted in the base member 2, the clamping heads 24 are arranged in the hole 5, their cams 25 engaging in the gap between the tabs 12 and the shoulder 11 and their radial end faces 28 preferably abutting the hole face 10 in a somewhat biased manner. The radially outer ends of the actuating levers 27 abut the annular piston 4 with a small amount of axial bias and thus hold the cams 25 against the tabs 12. The clamping member 3 is also secured by screws 35 when in the assembled position, which screws extend through holes in individual clamping elements 21 and are fixed to the base member. Any rotation of the clamping member 3 against the base member 2 is thus prevented.

Figure 2:
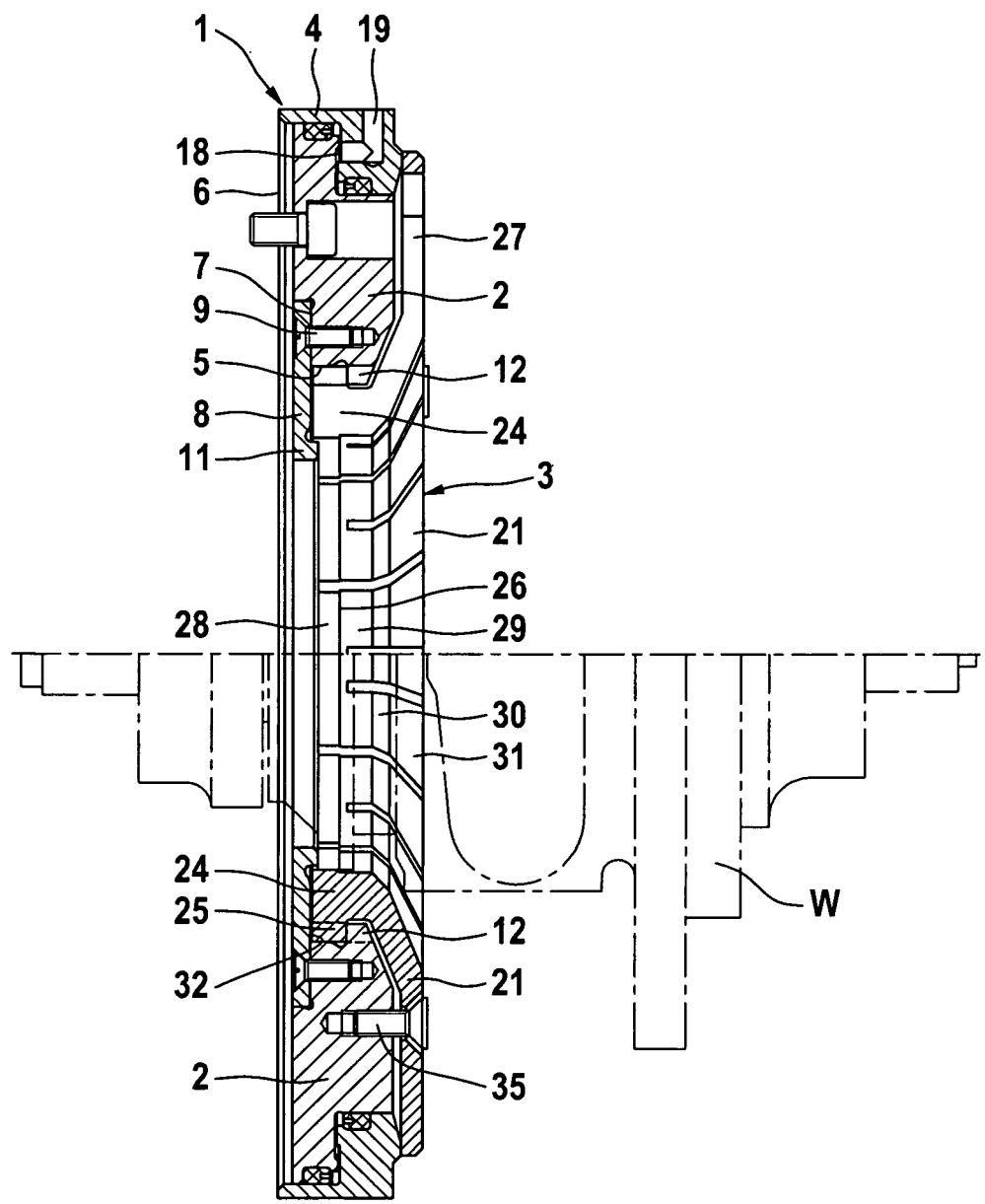
FIG. 2 is a sectional view along line II-II of the clamp coupling according to FIG. 1.
Figure 3:
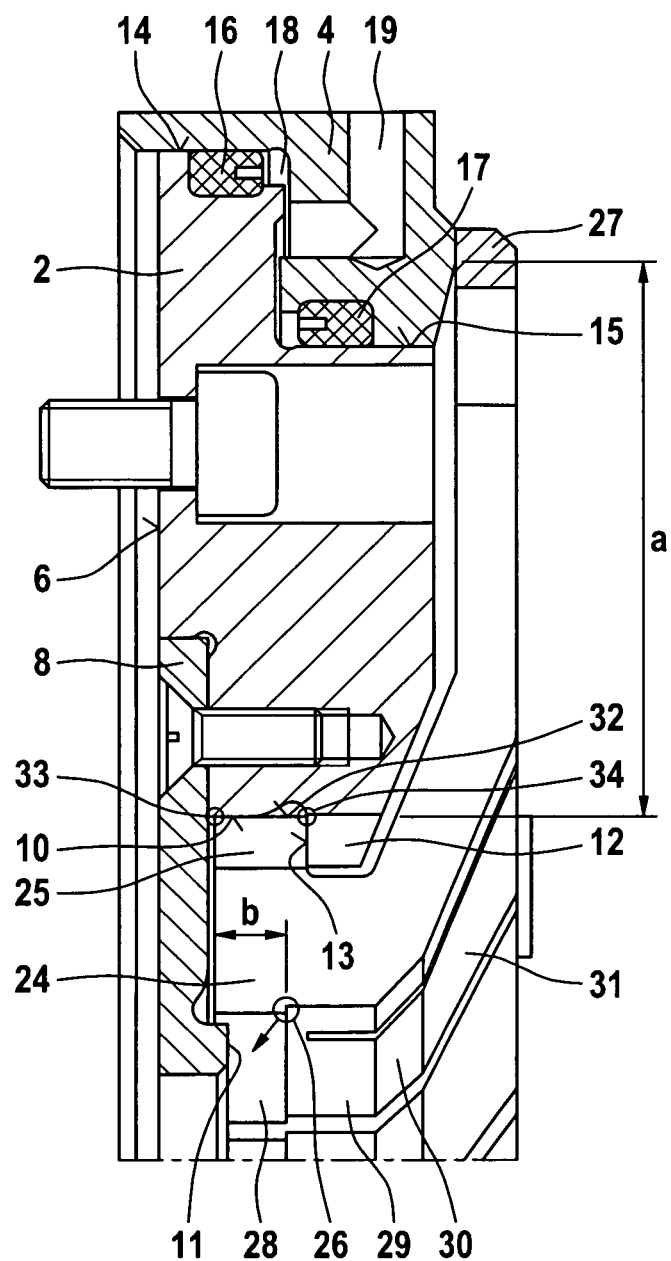
FIG. 3 is an enlarged detail of the sectional view according to FIG. 2.

FIG. 2 shows the clamp coupling 1 in the released position. In this position a workpiece W comprising a cylindrical outer clamping surface and a radial contact surface which abuts said outer clamping surface can be inserted into the clamp coupling 1, said workpiece being introduced into the front hole face 28 of the clamping heads 24 via its outer clamping surface until its contact surface contacts the planar surface of the shoulder 11. The clamping process is then carried out, the annular piston 4 being moved, for example, by the supply of compressed air into the annular chamber 18, against the actuating lever 27 and the outer ends of said actuating lever being moved away from the base member 2. The movement of the actuating lever 27 causes the clamping heads 24 to rotate about the front edge 33 abutting the hole face 10 whilst, at the same time, the rear edges 34 supported by the contact surfaces 13 of the tabs 12 are displaced in a radially inwards direction. The rotation of the clamping heads 24 also causes the clamping edges 26 to move radially inwards towards the shoulder 11, the workpiece W being centered relative to the base member 2 and axially abutting the shoulder 11. The restoring forces from the clamping force exerted by the clamping edges 26 are transferred from the cams 25 at the front edges 33 to the hole face 10 and at the rear edges 34 to the tabs 12. Owing to the relatively large effective lever length a of the actuating lever 27 compared with the effective lever length b at the clamping heads 24, the actuating force exerted by the annular piston 4 is considerably increased in such a way that relatively low loads are sufficient to produce the clamping force necessary for secure clamping. The plurality of clamping heads 24 and their radial support at the hole face 10 of the base member 2, which hole face can be produced in a precise manner, ensures that the workpiece is clamped in a concentric manner. This is further supported by the axial pressing of the workpiece during the clamping process, since the entire periphery of the radial contact surfaces of the workpiece are pressed against the shoulder 11.

In order to release the clamp coupling 1, the annular piston 4 is decompressed and moved back into the starting position by the intrinsic spring force of the clamping member 3. In order to support the releasing movement, additional restoring springs may be provided which are supported on the base member 2 and pull the actuating lever 27 back into the idle position. In order to accelerate movement of the clamping member 3 in the release direction, a double-acting annular piston may also be provided which actuates the clamping process in one direction and supports the releasing process in the other direction. It is thus also possible, using a double-acting piston of this type, to move the clamping member 3 further in the release direction than can be achieved with its own spring force. The clamping member 3 can thus be opened further in the release position and therefore a greater insertion clearance for inserting the workpiece is obtained.

Figures 4, 5:
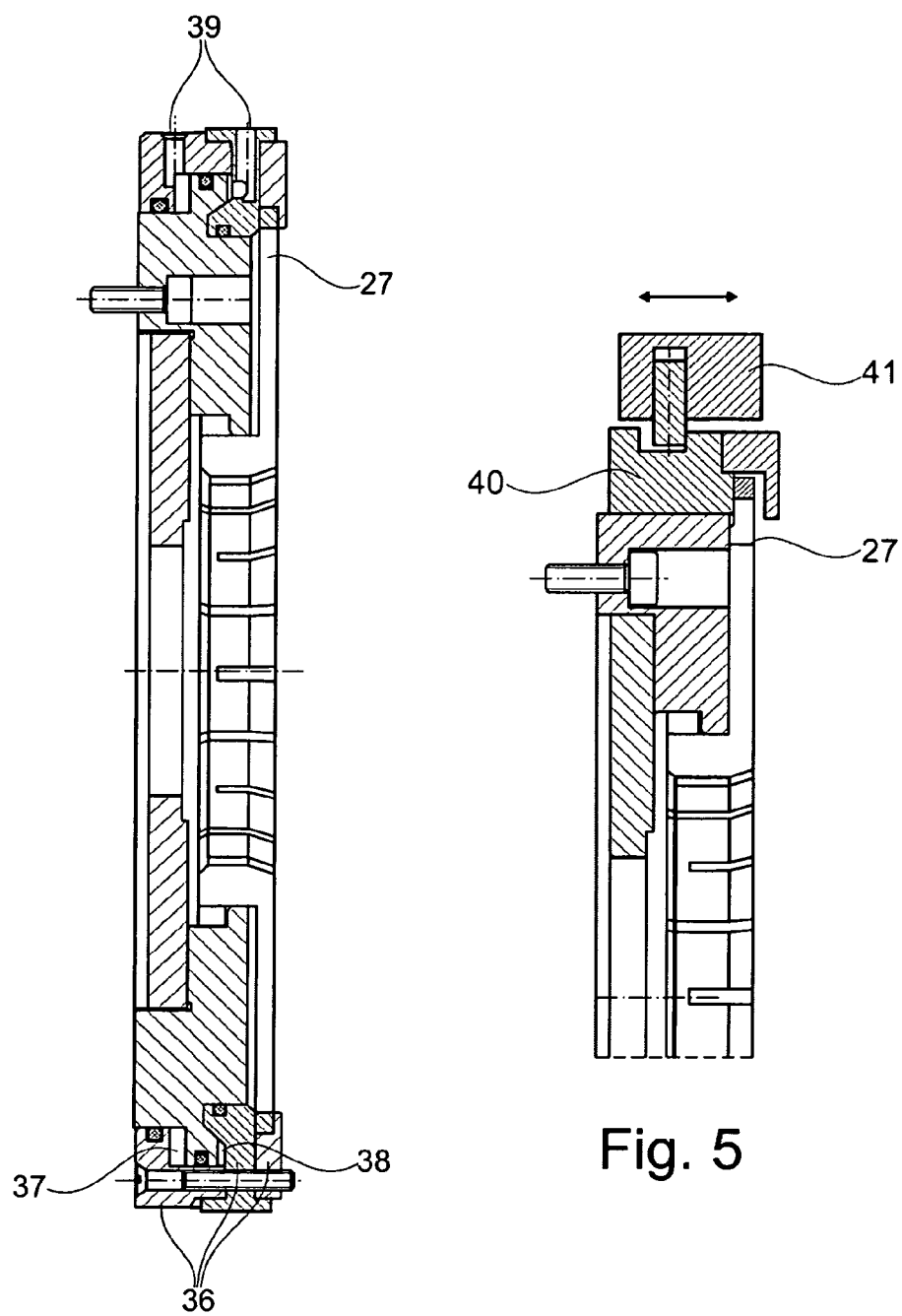
FIG. 4 shows a cross section of an embodiment of the clamp coupling.
FIG. 5 shows a sectional view of a clamping chuck.

FIG. 4 shows a cross section of the clamp coupling provided with a double acting piton 36 for moving the radially outer ends of the actuating levers 27. Compressed air or hydraulic fluid are fed through connecting channels 39 either into chamber 38 for clamping movement or into chamber 37 for release movement of the actuating levers 27.

FIG. 5 shows the part of a sectional view of a clamping chuck including an actuation ring 40 for actuating the radial outer ends of the actuating levers 27. The actuation ring can be moved by a shift fork having two opposite arms 41 which are mechanically coupled to the actuation ring 40.

What is claimed is:

1. Clamping chuck for radially clamping workpieces with a cylindrical outer clamping surface, comprising an annular base member which has a hole, an axially-extending hole face and tabs which project inwards radially, and comprising a shoulder, which projects inwards radially and forms a contact surface for the workpiece, and a clamping device which is supported on the base member and has a plurality of substantially L-shaped clamping elements which each comprise a clamping head arranged in the hole and an actuating lever which extends outwards radially from the clamping head, wherein each clamping head comprises, on the outer side thereof, at least one cam, which projects outwards radially, engages in an axial gap between the shoulder and the tabs and is supported radially by the hole face and axially by at least one tab, and on the radial inner side thereof, a workpiece-engaging clamping edge which is arranged in such a way that, upon rotation of the clamping elements, during which the actuating lever moves away from the base member, said edge moves inwards in a radial direction and towards the shoulder in an axial direction.

2. Clamping chuck according to claim 1, wherein the clamping elements are arranged adjacent to one another in an annular manner and are connected to one another by resilient connection elements to form a clamping member.

3. Clamping chuck according to claim 2, wherein the clamping member is formed in one piece and comprises radial slots by means of which the individual clamping elements are separated from one another.

4. Clamping chuck according to claim 1, wherein the tabs of the base member and the cams of the clamping member are in each case arranged at regular identical distances from each other, and wherein the distance between the tabs is greater than the width of the cams in the circumferential direction.

5. Clamping chuck according to claim 1, wherein an axially displaceable annular piston is arranged on the base member for actuating the clamping elements.

6. Clamping chuck according to claim 5, wherein the annular piston delimits an annular chamber which has a connection for supplying a hydraulic or pneumatic pressure medium.

7. Clamping chuck according to claim 5, wherein the annular piston is formed so as to be a double-acting piston.

8. Clamping chuck according to claim 5, wherein the annular piston is formed as an actuation ring which can be actuated mechanically by means of a shift fork.

9. Clamping chuck according to claim 1, wherein the base member comprises a planar flange face on the side remote from the clamping device.

\* \* \* \* \*